US007814807B2

(12) United States Patent
Hirabayashi

(10) Patent No.: US 7,814,807 B2
(45) Date of Patent: Oct. 19, 2010

(54) ENGINE STARTER HAVING INTERMEDIATE GEAR

(75) Inventor: Takashi Hirabayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 216 days.

(21) Appl. No.: 11/598,063

(22) Filed: Nov. 13, 2006

(65) Prior Publication Data

US 2007/0107544 A1 May 17, 2007

(30) Foreign Application Priority Data

Nov. 11, 2005 (JP) ............................ 2005-327446

(51) Int. Cl.
*F16H 3/34* (2006.01)
*F02N 15/02* (2006.01)

(52) U.S. Cl. .......................................... 74/352; 74/7 E

(58) Field of Classification Search ....................... 74/6, 74/7 A, 7 B, 7 C, 7 E, 7 R, 352, 373, 375; 403/396

See application file for complete search history.

(56) References Cited

U.S. PATENT DOCUMENTS 5,245,881 A * 9/1993 Rometsch ..................... 74/7 A
5,895,993 A * 4/1999 Kajino et al. ................. 310/83
6,647,812 B2 11/2003 Nito et al.
6,880,415 B2 * 4/2005 Nito ................................ 74/6
7,526,973 B2 * 5/2009 Katoh .......................... 74/7 R
7,552,656 B2 * 6/2009 Miyake ........................ 74/7 R
2004/0177710 A1 * 9/2004 Kajino et al. ................. 74/7 A
2006/0219032 A1 * 10/2006 Miyake ........................ 74/7 E

FOREIGN PATENT DOCUMENTS

JP 2002-180937 A 6/2002
JP A-2006-169983 6/2006
JP 2006-194180 7/2006

OTHER PUBLICATIONS

German Office Action with English Translation dated Jun. 24, 2009.
Foreign Official Communication with English-language translation. Aug. 18, 2009.

* cited by examiner

*Primary Examiner*—Roger Pang
(74) *Attorney, Agent, or Firm*—Oliff & Berridge, PLC

(57) ABSTRACT

A starter is provided, which includes an intermediate gear connected to an intermediate shaft, and engaging with and driven by a pinion gear which is connected to an output shaft of a motor. The intermediate gear engages with a ring gear of an engine to crank up the engine when shifted together with the pinion gear in axial directions of these shafts via a retainer which is slidably supported by both of these shafts. A clutch supported by the shaft of the motor causes this shift by pushing the retainer in its axial direction. The clutch and the intermediate gear, each being defined by its outermost diameter, overlap with each other in the radial direction between these shafts. This overlap reduces stress acting on the retainer when the intermediate gear engages with the ring gear, thus reducing thickness of the retainer and the axial length of the starter.

17 Claims, 4 Drawing Sheets

ENGINE STARTER HAVING INTERMEDIATE GEAR

CROSS-REFERENCE TO RELATED APPLICATION

This application is based on and claims the benefit of priority from earlier Japanese Patent Application No. 2005-327446 filed on Nov. 11, 2005 the description of which is incorporated herein by reference.

BACKGROUND OF THE INVENTION

1. Technical Field of the Invention

The present invention relates to an engine starter (i.e. starter for engines), and in particular, to an engine starter having an intermediate gear, in which torque of an output shaft of a motor is transferred to an internal combustion engine through a ring gear thereof by having the ring gear engaged with the intermediate gear to crank up the engine.

2. Related Art

As related art, Japanese Patent Laid-Open No. 2002-180937 (U.S. Pat. No. 6,647,812) discloses an engine starter having an intermediate gear. As shown in FIG. 4, this engine starter includes a pinion gear 110 for transmitting the motor torque to a ring gear 160 of an engine through a clutch 100, an intermediate gear 120 which is constantly in engagement with the pinion gear 110, and a retainer 150 which is in engagement with a boss portion 130 provided to the pinion gear 110 and with a boss portion 140 provided to the intermediate gear 120. The clutch 100 allows the intermediate gear 120 to move in the axial direction (leftward in FIG. 4) integrally with the pinion gear 110 through the retainer 150 for engagement with the ring gear 160 of the engine, so that the torque transmitted to the pinion gear 110 is transmitted to the intermediate gear 120 and further to the ring gear 160 to start the engine.

However, in the engine starter mentioned above, the retainer 150 has been required to have a large thickness in the axial direction, which has resulted in making the length of the engine starter problematically large as a whole. The reasons are as provided below. In the engine starter mentioned above, an outermost diameter of a step portion 170 provided on a non-ring-gear side of the intermediate gear 120 (rightward in FIG. 4) is radially distanced (by an area indicated by S in FIG. 4) from an outermost diameter of the clutch 100. Therefore, when impacts m1 and m2 are imparted to the retainer 150 by the engagement of the intermediate gear 120 with the ring gear 160, the impacts m1 and m2 cause a bending moment that acts on an area indicated by X in FIG. 4 in the retainer 150. The area indicated by X corresponds to a surrounding area defined by the outermost diameter of a surface of the step portion 170 formed in the intermediate gear 120 and opposed to the retainer 150, and by the outermost diameter of a surface of the clutch 100, which surface is on the side of the retainer 150. In order to prevent the retainer 150 from being deformed by the bending moment (stress), it has been required that its mechanical strength be increased by making the thickness of the retainer 150 large in the axial direction. Thus, it has been a problem that the axial length becomes large in an engine starter having an intermediate gear.

SUMMARY OF THE INVENTION

The present invention has been made in light of this problem in the conventional art, and has an object of providing a short-axis engine starter having an intermediate gear by reducing the bending moment that acts on a retainer and by reducing the thickness of the retainer.

A feature of the present invention is that a face of the clutch opposing the retainer and a face of the intermediate gear opposing the retainer overlaps through the retainer so as to suppress to the bending moment generated in the vicinity of contacting portion of these two faces to the retainer when these two faces contact with the retainer.

Another feature of the present invention is that areas of surfaces of elements contacting with both sides of the retainer under operation are set as large as possible so as to effectively dissipate the stress imposed on the retainer when the elements contact with the retainer.

Still another feature of the present invention is that the elements are arranged closer to the retainer so as to reduce an impact to the retainer when the elements contact the retainer during operation.

Specifically, the present invention provides an engine starter having an apparatus for transmitting a rotational torque of a motor to an external gear (e.g., a ring gear of the engine), the apparatus comprising: a first shaft supporting a clutch and a first gear thereon, the first shaft rotated by the motor; a second shaft in which a rotational axis thereof being parallel to a rotational axis of the first shaft, the second shaft supporting a second gear thereon so that the second gear engages with the first gear; a retainer positioned between the clutch and the first gear, slidably supported on both the first and second shafts, and transferring the rotational torque of the first shaft to the external gear when the second gear engages with the external gear by being pushed together with the first gear engaging therewith via the retainer by the clutch; wherein a first face of the clutch opposing the retainer and a second face of the second gear opposing the retainer on the opposite side of the retainer partially faces each other via the retainer between the first and the second shafts.

Preferably, the second gear (e.g., the intermediate gear) is constantly in engagement with the first gear (e.g., the pinion gear).

Preferably, the retainer engages with a (first) boss portion provided to the pinion gear and with a (second) boss portion provided to the intermediate gear.

Preferably, the retainer locates within a specified restricted region in the first/second axial direction.

BRIEF DESCRIPTION OF THE DRAWINGS

A preferred form of the present invention is illustrated in the accompanying drawings in which.

DETAILED DESCRIPTION OF PREFERRED EMBODIMENT

Arrangement

Hereinafter is described a best mode embodiment of the present invention with reference to FIGS. 1 to 3.

Figure 1:
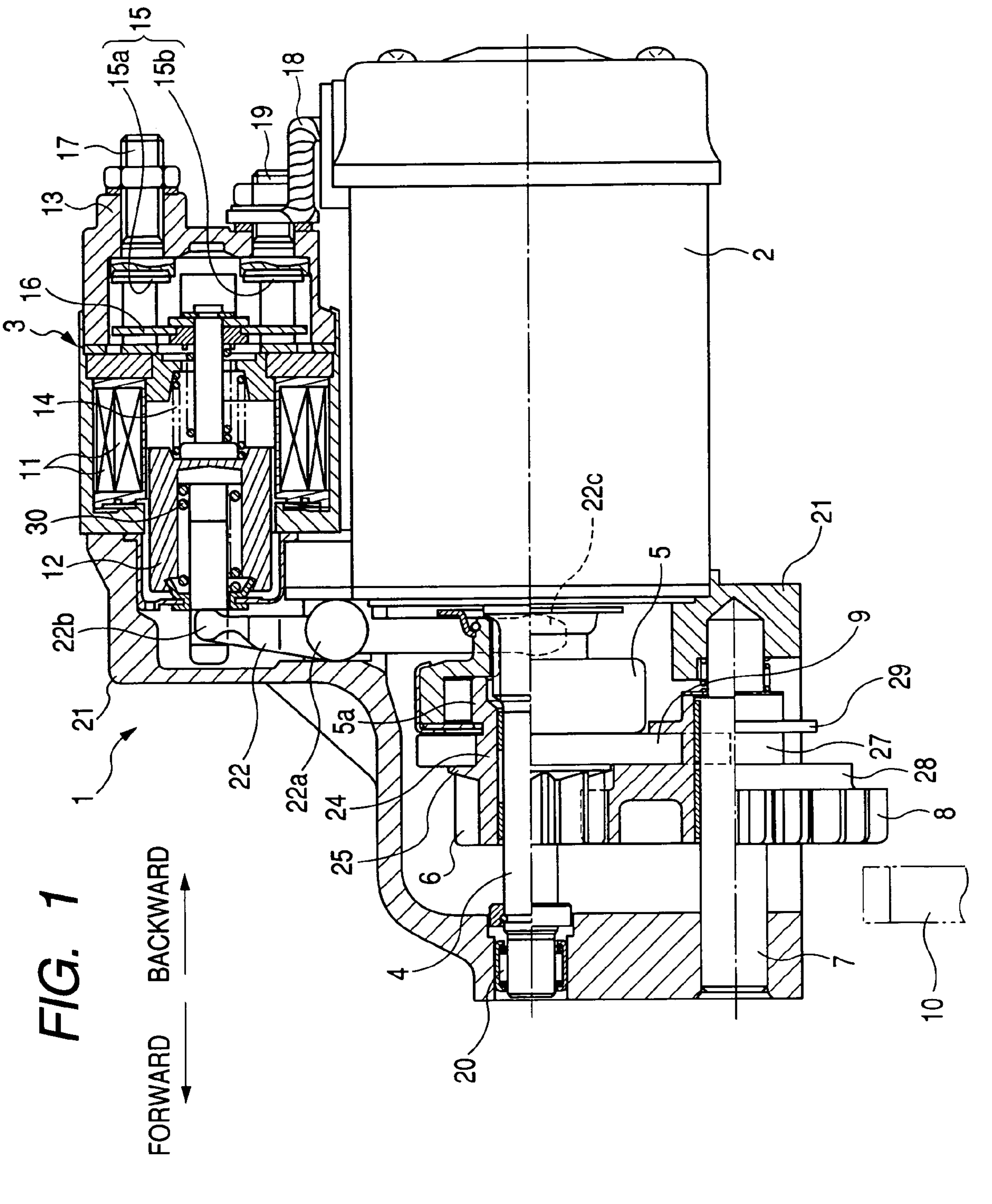
FIG. 1 is a general view of an engine starter having an intermediate gear including partial cross section according to an embodiment of the present invention.

FIG. 1 is a general view of a starter 1 having an intermediate gear including a partial cross section. FIG. 2 is cross-sectional view of a principal part of the starter 1 having an intermediate gear. FIG. 3 is a front view of a principal part of the starter 1 having the intermediate gear.

A general arrangement of the starter 1 is described first with reference to FIG. 1.

As shown in FIG. 1, the starter 1 includes a motor 2 for generating torque, an electromagnetic switch 3 for opening/closing a main contact (will be described later) provided in a motor circuit, a pinion shaft 4 which rotates being driven by the motor 2, a pinion gear 6 supported by the pinion shaft 4 integrally with a clutch 5, an intermediate shaft 7 disposed parallel to the pinion shaft 4, an intermediate gear 8 supported by the intermediate shaft 7, and a retainer 9 for coupling the pinion gear 6 to the intermediate gear 8. An arrangement is so made that the intermediate gear 8 is moved leftward in FIG. 1 integrally with the pinion gear 6 through the retainer 9 for engagement with a ring gear 10 of an engine.

The motor 2 is a known DC electric motor in which the main contact is operatively closed by the electromagnetic switch 3 to allow an in-vehicle battery (not shown) to supply power, so that an electromagnetic force acts on an incorporated armature to generate torque.

An arrangement associated with a switch of the starter 1 is described with reference to FIG. 1.

The electromagnetic switch 3 includes: a solenoid in which an electromagnet is formed when current is passed through an electromagnetic coil 11 to drive (attract) a plunger 12 with the attraction force of the electromagnet; and a contact cover 13 made of resin, which is fixed to the solenoid, a main contact being disposed in the contact cover 13.

The solenoid is incorporated with a return spring 14 for pulling back the plunger 12 when the attraction force of the electromagnet is eliminated by stopping current supply to the electromagnetic coil 11.

The main contact is structured by a pair of fixed contacts 15 (15*a*, 15*b*) connected to the motor circuit through two external terminals (which will be described below), and by a movable contact 16 which intermittently establishes connection between the pair of fixed contacts 15 being driven by the plunger 12. The main contact is brought to a closed state when current is passed between the pair of fixed contacts 15 through the movable contact 16, and brought to an opened state when current is shut out between the pair of fixed contacts 15.

One of these two external terminals is a B-terminal 17 which is connected to the in-vehicle battery through a battery cable (not shown), and the other is an M-terminal 19 which is connected to a lead 18 drawn from the motor 2. These two terminals are arranged through the contact cover 13 in which the fixed contacts 15 (15*a*, 15*b*) reside.

An arrangement governing an interlock between the switch and the motor is described below again referring to FIG. 1.

The pinion shaft 4 is in alignment with an armature shaft (not shown) of the motor 2, with one end thereof being rotatably supported by a housing 21 through a bearing 20, and the other end being coupled to the armature shaft through a reduction gear (e.g., an epicycle reduction gear, not shown). Alternatively, such a reduction gear may be omitted to provide an arrangement in which the armature shaft and the pinion shaft 4 are directly coupled.

The clutch 5 is structured as a one-way clutch, which is in helical spline connection with an outer periphery of the pinion shaft 4 to transmit rotation of the pinion shaft 4 to the pinion gear 6 when the engine is started, and to shut off transmission of mechanical power between the pinion gear 6 and the pinion shaft 4 when the pinion gear 6 is rotated with the start of the engine, i.e. when the rotational speed of the pinion gear 6 becomes higher than that of the pinion shaft 4, so that the rotation of the engine is not transmitted to the pinion shaft 4. This clutch 5 is coupled to the plunger 12 of the electromagnetic switch 3 through a shift lever 22. When the movement of the plunger 12 is transmitted through the shift lever 22, the clutch 5 becomes axially movable on the pinion shaft 4 under the action of the helical spline.

The shift lever 22 has a lever support 22*a* at substantially a midpoint thereof, which is supported by the housing 21 in a swingable manner. One end 22*b* of the shift lever 22 is coupled to the plunger 12 of the electromagnetic switch 3 and the other end 22*c* of the lever 22 is engaged with the clutch 5, so that the movement of the plunger 12 is transmitted to the clutch 5. In particular, when the plunger 12 is attracted by the electromagnet and shifted rightward in FIG. 2, the lever end 22*b* coupled to the plunger 12 is also shifted being pulled by the plunger 12. Then, the lever end 22*c*, which is in engagement with the clutch 5, is swung about the lever end 22*a* to thereby push the clutch 5 in a direction opposite to the motor.

Figure 2:
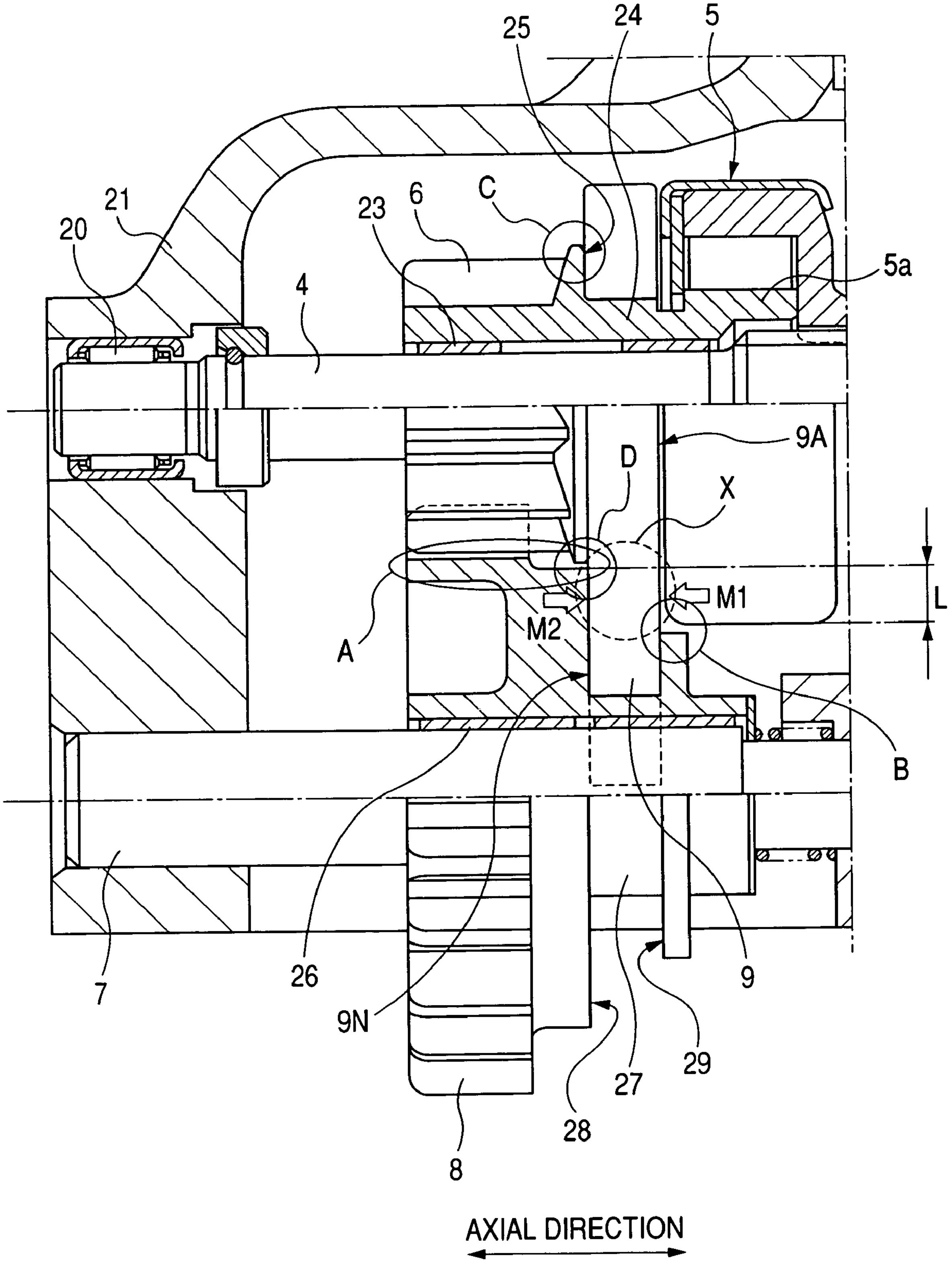
FIG. 2 is a cross-sectional view of the engine starter having the intermediate gear according to the embodiment of the present invention.
Figure 3:
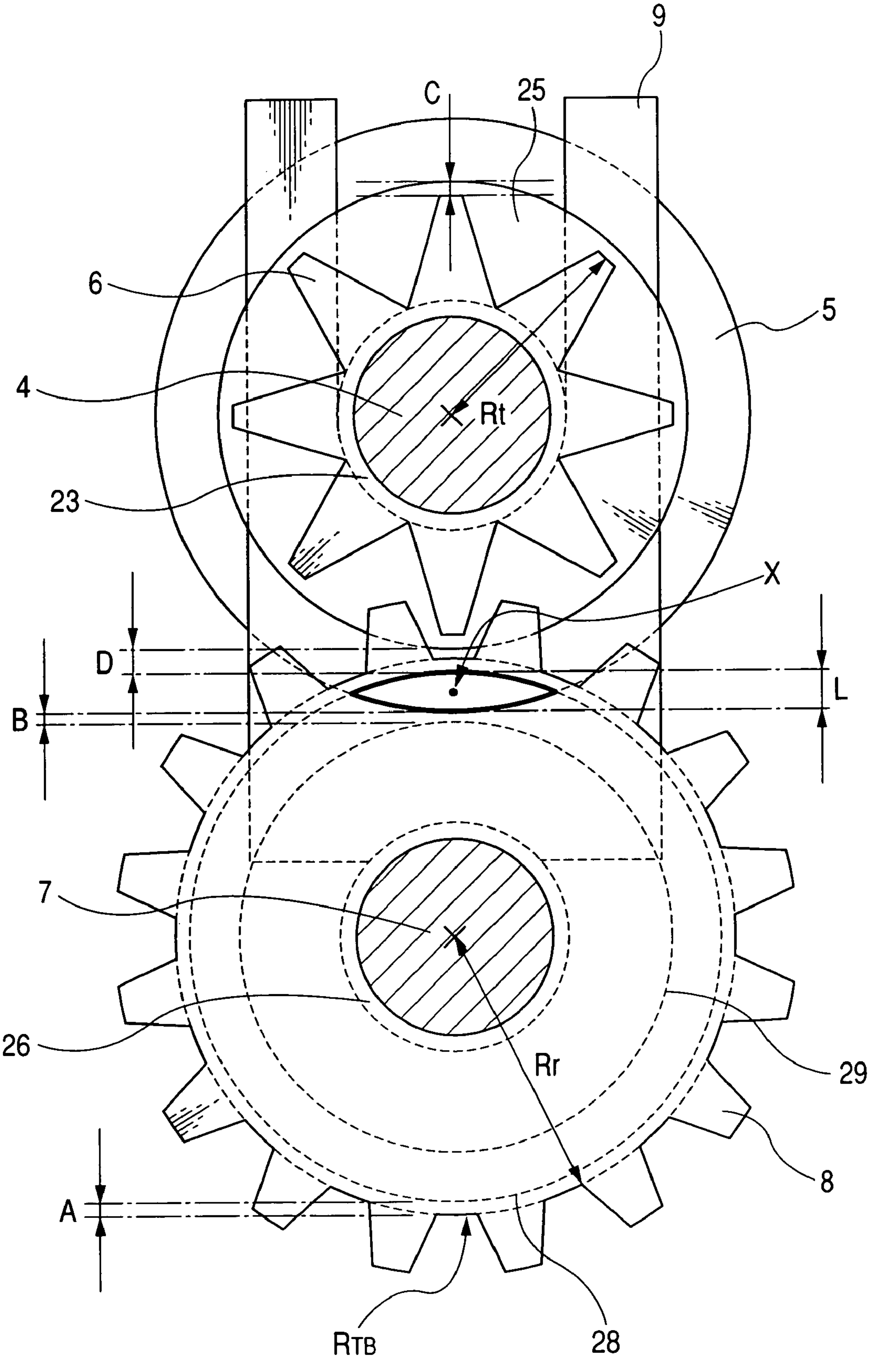
FIG. 3 is a front view of the engine starter having the intermediate gear according to the embodiment of the present invention.

Referring now to FIGS. 2 and 3, an arrangement of a principal part (torque transmission part) of the starter 1 is described below.

The pinion gear 6 is located on a side of the clutch 5 not confronting the motor (left side of FIG. 2) and is supported by an outer periphery of the pinion shaft 4 through a bearing 23. The rotation of the pinion shaft 4 is transmitted to the pinion gear 6 through the clutch 5 so that the pinion gear 6 becomes movable on the pinion shaft 4 integrally with the clutch 5. The pinion gear 6 is provided with a cylindrical pinion boss portion 24 on a side confronting the clutch 5, and is integrated with an inner 5*a* of the clutch 5 through the pinion boss portion 24. At one end of the pinion gear 6 on the side of the clutch, a pinion wall portion 25 is circularly formed throughout the periphery of the pinion gear 6 centering on an axis of itself, with an end surface of the pinion wall portion 25 on the side of the clutch being at right angle to an outer peripheral surface of the pinion boss portion 24.

An intermediate shaft 7 is rotatably supported by the housing 21 at the opposed ends of the intermediate shaft 7 (refer to FIG. 1).

An intermediate gear 8 is rotatably fitted to the intermediate shaft 7 along an outer periphery thereof with a bearing 26 interposed therebetween, and in engagement with the pinion gear 6. Preferably, the intermediate gear 8 is constantly in engagement with the pinion gear 6. The intermediate gear 8 is integrally provided, on a side not facing the ring gear, with an intermediate-gear boss portion 27 of a cylindrical shape. The intermediate-gear boss portion 27 has, on its ring-gear side, a wall portion 28 which is at right angle to the boss portion 27, and on its non-ring-gear side, a wall portion 29 which is at right angle to the boss portion 27.

The retainer 9 is made of resin, for example, and is in engagement with the boss portion 24 provided at the pinion gear 6 and the boss portion 27 provided at the intermediate gear 8 in a manner enabling relative rotation.

One side of the retainer 9 engaging with the pinion-gear boss portion 24 is located between the pinion wall portion 25 and the clutch 5, by both of which the axial direction of the pinion shaft 4 is defined.

The other side of the retainer 9 engaging with the intermediate-gear boss portion 27 is located between the wall portion 28 and the wall portion 29, by both of which the axial direction of the intermediate shaft 7 (which is parallel to the axial direction of the pinion shaft 4).

When the pinion gear 6 and the intermediate gear 8 are coupled to each other through the retainer 9 so that the pinion gear 6 axially moves on the pinion shaft 4, the intermediate gear 8 moves in the axial direction on the intermediate shaft 7 integrally with the pinion gear 6.

Finally, main structural features of the present invention are described referring to FIGS. 2 and 3.

(1) Portion X (Structure of the Portion Indicated by X in FIGS. 2 and 3)

The outermost diameter of the wall portion 28 and the outermost diameter of the clutch 5 radially overlap with each other between the pinion shaft 4 and the intermediate shaft 7.

(2) Portion A (Structure of the Portion Indicated by A in FIGS. 2 and 3)

The outermost diameter of the wall portion 28 is made substantially equal to the teeth-bottom diameter (the diameter of dedendum circle; Rr in FIG. 3) of the intermediate gear 8, or the former is made slightly smaller than the latter.

(3) Portion B (Structure Indicated by B in FIGS. 2 and 3)

A minimum clearance (e.g., 0.5 to 1.0 mm) is provided between the clutch 5 defined by its outermost diameter and the wall portion 29 defined by its outermost diameter, the clearance being of a degree not bringing the both into contact with each other.

(4) Portion C (Structure Indicated by C in FIGS. 2 and 3)

The outermost diameter of the pinion wall portion 25 is made larger than the teeth-tip diameter (the diameter of addendum circle; Rt in FIG. 3) of the pinion gear 6.

(5) Portion D (Structure Indicated by D in FIGS. 2 and 3)

A minimum clearance (e.g., 0.5 to 1.0 mm) is provided between the pinion wall portion 25 defined by its outermost diameter and the wall portion 28 defined by its outermost diameter, the clearance being of a degree not bringing the both into contact with each other.

(Operation)

Hereinafter, the operation of the starter 1 having an intermediate gear is described with reference to FIG. 1.

When an electromagnet is formed with the supply of current to the electromagnetic coil 11 of the electromagnetic switch 3, the plunger 12, being attracted by the electromagnet, moves rightward in FIG. 1 along an inner side of the electromagnetic coil 11. When the movement of the plunger 12 is transmitted to the clutch 5 through the shift lever 22, the pinion gear 6 moves integrally with the clutch 5 on the pinion shaft 4 in the direction opposite to the motor (leftward in FIG. 1). At the same time, the intermediate gear 8, which is coupled to the pinion gear 6 through the retainer 9, moves on the intermediate shaft 7 while being in engagement with the pinion gear 6, and temporarily stops in a state where a side face of the intermediate gear 8 and a side face of the ring gear 10 are in contact with each other.

On the other hand, when the main contact is closed by the electromagnetic switch 3, power is supplied from the in-vehicle battery to the motor 2 to generate torque in the armature, which torque is then transmitted to the pinion shaft 4 through the reduction gear. The rotation of the pinion shaft 4 is transmitted to the pinion gear 6 through the clutch 5 and then to the intermediate gear 8 engaged with the pinion gear 6.

When the intermediate gear 8 is rotated to a position enabling engagement with the ring gear 10, a reaction force of a drive spring 30, which is incorporated in the electromagnet switch 3, is transmitted to the clutch 5 through the shift lever 22, whereby the intermediate gear 8 is pushed leftward in FIG. 1 for engagement with the ring gear 10.

In this way, the driving torque of the motor 2 is transmitted to the ring gear 10 from the pinion gear 6 through the intermediate gear 8 so that the engine is cranked.

After the engine is started, supply of current to the electromagnetic coil 11 is stopped to eliminate the attraction force of the electromagnet. Then, the plunger 12 is pushed back by a reaction force of a return spring 14 incorporated in the electromagnetic switch 3, by which the main contact of the motor circuit is opened to stop the current supply from the battery to the motor 2 and thus to stop rotation of the armature.

When the plunger 12 is pushed back, the shift lever 22 swings back in a direction opposite to the one at the time of the engine start. This makes the pinion gear 6 withdraw integrally with the clutch 5 rightward in FIG. 1 on the pinion shaft 4, and at the same time makes the intermediate gear 8 disengage from the ring gear 10 and move on the intermediate shaft 7 in the direction opposite to the ring gear (rightward in FIG. 1).

(Effects)

The following is the enumeration of the effects brought about by the above structural features of the present invention accompanied by an explanation on each of the effects.

(1) As indicated by X in FIGS. 2 and 3, the outermost diameter of the wall portion 28 (which faces the end surface of the retainer 9 confronting the ring gear) and the outermost diameter of the clutch 5 radially overlap with each other between the pinion shaft 4 and the intermediate shaft 7.

When impacts M1 and M2 that occur upon engagement of the intermediate gear 8 with the ring gear 10 are given to the retainer 9, this overlapping structure allows the impact M2 given from the wall portion 28 to the retainer 9 to be received by the clutch 5 so as to act against the direction to which the impact M2 is being given. Further, this overlapping structure allows the impact M1 given from the clutch 5 to the retainer 9 to be received by the wall portion 28. As a result, bending of the retainer 9, which would have been caused by the impacts M1 and M2 in the vicinity indicated by X in FIG. 2 or 3, can be prevented from occurring.

Figure 4:
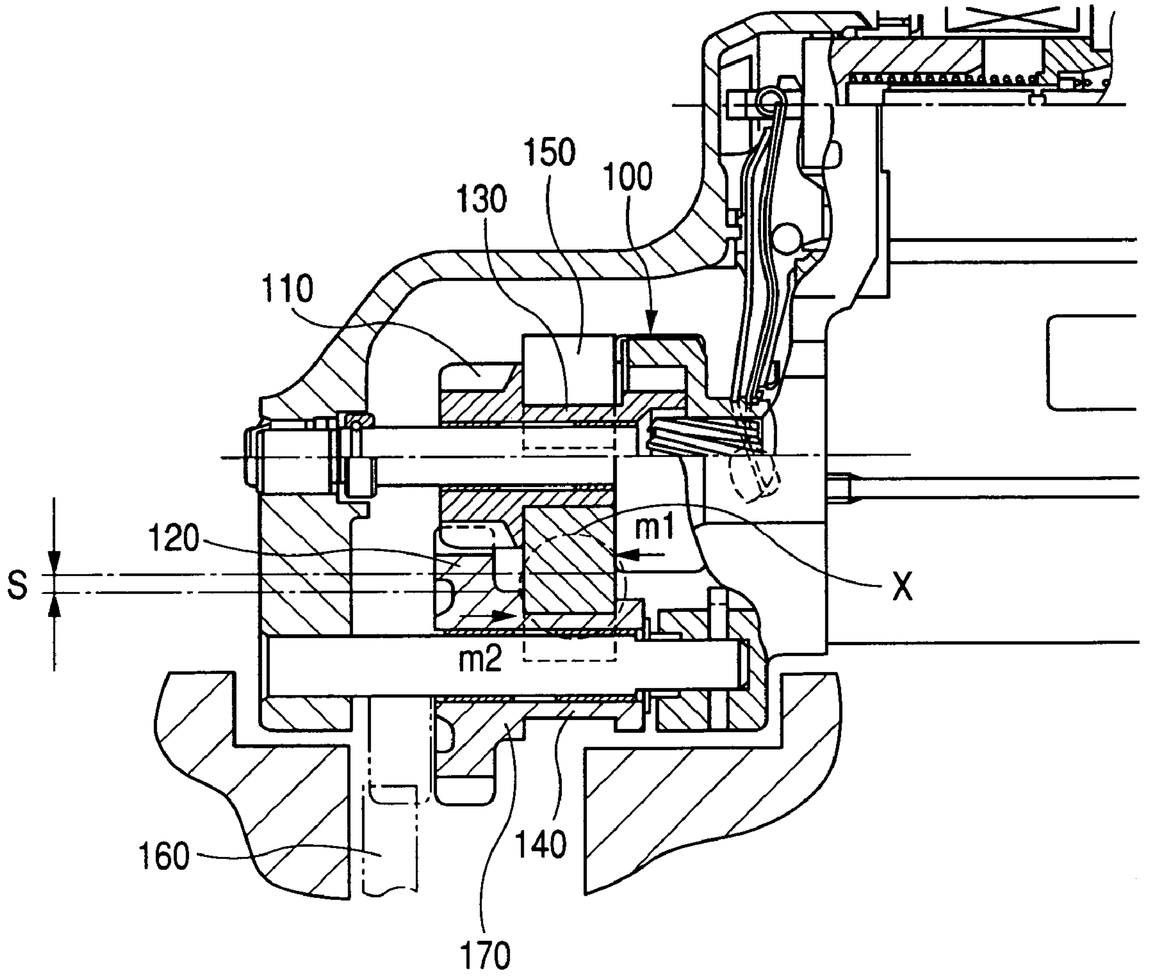
FIG. 4 is a cross-sectional view of a conventional engine starter having an intermediate gear.

In this way, the bending moment (stress) that has occurred in the vicinity of X in FIG. 1 and concentrated on the retainer 9 in case no overlapping structure is provided (refer to m1, m2 in FIG. 4), can be lessened by allowing the impact M1 and the impact M2 to be cancelled with each other or dispersed to the clutch 5 and to the wall portion 28. Accordingly, the mechanical strength of the retainer 9 to endure the impacts M1 and M2 may only be small, whereby the thickness of the retainer 9 in the axial direction can be made smaller than in the conventional case where no overlapping structure is provided.

(2) As indicated by A in FIGS. 2 and 3, the outermost diameter of the wall portion 28 is made substantially equal to a root diameter of the Intermediate gear 8, or the former is made slightly smaller than the latter (the root of the intermediate gear 8 is indicted by $R_{TB}$ in FIG. 3).

This structure may allow the outermost diameter of the wall portion 28 to be made maximum without causing any interference between the tooth portion of the pinion gear 6 and the wall portion 28. Further, the radially overlapped range between the wall portion 28 defined by its outermost diameter and the clutch 5 defined by its outermost diameter can be made larger.

Specifically, when the impacts M1 and M2 caused by the engagement of the intermediate gear 8 with the ring gear 10 is imparted to the retainer 9, the retainer 9 is barely inclined. The impacts M1 and M2 are mostly transmitted within the radially overlapped range between the wall portion 28 defined by its outermost diameter and the clutch 5 defined by its outermost diameter. Owing to this structure, large overlap can be achieved so as to ensure a larger area on the retainer 9 for transmitting the impact M2 given from the wall portion 28 and a larger area on the clutch 5 for receiving the impact M2 given from the retainer 9. As a result, the stress that acts on the retainer 9 can be reduced.

(3) As indicated by B In FIGS. 2 and 3, a minimum clearance (e.g., 0.5 to 1.0 mm) is provided between the clutch 5 defined by its outermost diameter and the wall portion 29 defined by its outermost diameter, the clearance being of a degree not bringing the both into contact with each other.

This structure can ensure maximum areas in the wall portion 29 and in the clutch 5 for receiving an end surface 9A of the retainer 9 not confronting the ring gear. As a result, the bending moment induced by the impacts M1 and M2 at the time when the pinion gear 6 returns to its home position and acts on the retainer 9 can be reduced.

(4) As indicated by C In FIGS. 2 and 3, the outermost diameter of the pinion wall portion 25 is made larger than the teeth-tip diameter of the pinion gear 6.

This structure can ensure a maximum area in the wall portion 25 for receiving an end surface 9N of the retainer 9 confronting the ring gear. As a result, the bending moment induced by the impacts M1 and M2 at the time when the pinion gear 6 returns to its home position and acts on the retainer 9 can be reduced. Further, even when the tip diameter of the pinion gear 6 is small, a large reception area can be ensured in the pinion wall portion 25 without being influenced by the smallness of the tip diameter.

(5) As indicated by C in FIGS. 2 and 3, D, a minimum clearance (e.g., 0.5 to 1.0 mm) is provided between the pinion wall portion 25 defined by its outermost diameter and the wall portion 28 defined by its outermost diameter, the clearance being of a degree not bringing the both into contact with each other.

This structure can ensure maximum areas in the pinion wall portion 25 and in the wall portion 28 for receiving the end surface 9N. As a result, the bending moment induced by the impacts M1 and M2 at the time when the pinion gear 6 returns to its home position and acts on the retainer 9 can be reduced.

As described above, even when the impacts M1 and M2 are caused by the engagement/disengagement between the intermediate gear 8 and the ring gear 10 and are imparted to the retainer 9, the provision of the overlap X, or preferably the maximization of the overlap range A, or the maximization of the reception areas B, C and D can ensure large reduction of the bending moment (stress) that occurs in the vicinity of X in FIGS. 2 and 3 and acts on the retainer 9, by allowing the impact M1 and the impact M2 to cancel with each other, or by allowing the impacts M1 and M2 to be efficiently canceled each other and dispersed to the wall portion 28, the clutch 5 and the wall portion 29.

Accordingly, the mechanical strength required for the retainer 9 may be made smaller for reduction of the thickness of the retainer 9. As a result, the axial length of the starter 1 can be reduced.

The arrangement, operation and effects of the present invention have been described taking a principal part of a starter (part of a torque transmission device) for example. However, by using the same arrangement, the same effects are expected to be achieved in torque transmission devices other than a starter. It will be appreciated that any and all modifications, variations or equivalent arrangements, which may occur to those who are skilled in the art, should be considered to fall within the scope of the present invention.

What is claimed is:

1. A starter for starting an engine provided with a ring gear, comprising:

a pinion shaft which is rotated by a motor having a rotating axis defining an axial direction as a direction along the rotating axis;

a clutch slidable along the pinion shaft in the axial direction;

a pinion gear rotatable around the pinion shaft and, together with the clutch, slidable along the pinion shaft in the axial direction, rotation of the pinion gear enabling a rotational torque of the pinion shaft to be transferred to the pinion gear;

an intermediate shaft which is parallel with the axial direction;

an intermediate gear rotatable around the intermediate shaft and slidable along the intermediate shaft in the axial direction, the intermediate gear engaging with the pinion gear so that the rotation torque is transferred from the pinion gear to the intermediate gear; and a retainer fitted on both the pinion gear and the intermediate gear and disposed between the pinion gear and the clutch in the axial direction, the retainer being pushed by the clutch so that the pinion gear moves, together with the intermediate gear, toward the ring gear in the axial direction, the intermediate gear engaging with the ring gear so that the rotational torque is transferred from the intermediate gear to the ring gear to crank up the engine, wherein the intermediate gear partly overlaps with the clutch between the pinion shaft and the intermediate shaft in a direction perpendicular to the axial direction, the retainer having a first side face, which faces the ring gear, and a second side face, which faces oppositely to the first side face, the intermediate gear having a first surface, which is opposed to the first side face of the retainer, the first surface of the intermediate gear overlapping with a second surface of the clutch between the pinion shaft and the intermediate shaft in the direction perpendicular to the axial direction, the pinion having a third surface, wherein the first surface of the intermediate gear and the third surface of the pinion are in contact with the first side face of the retainer, and the second surface of the clutch being in contact with the second side face of the retainer when the clutch pushes the retainer toward the ring gear.

2. The starter according to claim 1, wherein the intermediate gear constantly engages with the pinion gear.

3. The starter according to claim 1, wherein the pinion gear is provided with a first boss portion, the intermediate gear is provided with a second boss portion, and the retainer is supported on both the first boss portion provided to the pinion gear and the second boss portion provided to the intermediate gear.

4. The starter according to claim 3, wherein the intermediate gear is formed to have a fourth surface opposed to the first surface with the retainer intervening therebetween, and the retainer is fitted on both the first boss portion and the second boss portion and is formed to have a first portion disposed between the pinion and the clutch so as to positionally restrict the first portion therebetween and a second portion disposed between the first surface and the fourth surface so as to positionally restrict the second portion therebetween.

5. The starter according to claim 1, wherein the clutch has the second surface having a radial outermost end and the intermediate gear has the fourth surface having a radial outermost end and there is secured a clearance between the radial outermost end of the second surface and the radial outermost end of the fourth surface, the clearance being as small as required to keep apart the radial outermost end of the second surface from the radial outermost end of the fourth surface.

6. The starter according to claim 1, wherein the intermediate gear has teeth having a teeth-bottom diameter and the first surface portion has a diameter substantially equal to or slightly smaller than the teeth-bottom diameter of the intermediate gear.

7. The starter according to claim 1, wherein the pinion gear has teeth having a teeth-tip diameter and the third surface has a diameter greater than the teeth-tip diameter of the pinion gear.

8. The starter according to claim 1, wherein the first surface has a radial outermost end and the third surface has a radial outermost end and there is secured a clearance between the radial outermost end of the first surface and the radial outermost end of the third surface, the clearance being as small as required to keep apart the radial outermost end of the third surface from the radial outermost end of the first surface.

9. A starter for starting an engine having a ring gear cranking up the engine, the starter comprising:

a first shaft rotated by a motor;

a second shaft parallel to the first shaft;

a clutch provided to the first shaft;

a retainer provided to both the first and second shafts; and an intermediate gear provided to the second shaft, the intermediate gear being pushed in an axial direction of the second shaft via the retainer by the clutch so as to engage with the ring gear and transfer a rotational torque of the first shaft, wherein a first surface of the intermediate gear opposing the retainer is in contact with the retainer, and wherein an outer radial portion of the first surface partially overlaps a second surface of the clutch opposing the retainer on the opposite side of the retainer through the retainer.

10. The starter according to claim 9, wherein the intermediate gear receives constantly the rotational torque of the first shaft.

11. The starter according to claim 9, wherein a position of the retainer is substantially fixed in the first axial direction with a minimum sliding tolerance in the first axial direction.

12. A starter for starting an engine comprising:

a pinion shaft rotated by a motor and having a first axis;

a pinion gear being provided slidably to the pinion shaft in a first direction of the first axis and having a wall perpendicular to the first axial direction;

a clutch provided slidably to the pinion shaft together with the pinion gear in the first direction and formed to transfer a rotational torque of the pinion shaft to the pinion gear, the wall of the pinion gear facing the clutch;

an intermediate shaft having a second axis parallel to the first axis;

an intermediate gear provided rotatably to the intermediate shaft therearround and slidably in a second direction of the second axis so as to engage with the pinion gear; and a retainer movably fitted on both the pinion shaft and the intermediate shaft and disposed between the pinion gear and the clutch;

wherein outermost diameters of the clutch and the intermediate gear overlap each other between the first and the second axes in a perpendicular direction of the first and the second axes, and wherein the intermediate gear has a surface in contact with the retainer, the surface having an outer radial portion overlapping the clutch in a direction perpendicular to the second axis of the intermediate shaft.

13. The starter according to claim 12, wherein the pinion gear is provided with a first boss portion, the intermediate gear is provided with a second boss portion, and the retainer is supported on both the first boss portion provided to the pinion gear and the second boss portion provided to the intermediate gear.

14. The starter according to claim 13, wherein the second boss portion has first and second wall portions cooperatively sandwiching the retainer so that a position of the retainer is restricted therebetween, the first wall portion being located further from teeth of the intermediate gear than the second wall portion.

15. The starter according to claim 12, wherein the clutch has an outermost diameter and the first wall portion has an outermost diameter, wherein the outermost diameters of both the clutch and the first wall portion are set to secure a clearance between the clutch and the first wall portion, the clearance being as small as required to keep away the clutch from the first wall portion between the first and the second axes.

16. The starter according to claim 14, wherein the intermediate gear has teeth having a teeth-bottom diameter and the second wall portion has a diameter substantially equal to or slightly smaller than a teeth-bottom diameter of the intermediate gear.

17. The starter according to claim 12, wherein the pinion gear has teeth having a teeth-tip diameter and the wall of the pinion gear has a diameter greater than the teeth-tip diameter of the pinion gear.

* * * * *